(12) United States Patent
Miyoshi

(10) Patent No.: US 8,577,858 B2
(45) Date of Patent: Nov. 5, 2013

(54) DATA RETRIEVAL APPARATUS, DATA RETRIEVAL METHOD, AND PROGRAM

(75) Inventor: Kunihiko Miyoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/312,838

(22) Filed: Dec. 6, 2011

(65) Prior Publication Data

US 2012/0150830 A1    Jun. 14, 2012

(30) Foreign Application Priority Data

Dec. 13, 2010    (JP) .................................. 2010-277317

(51) Int. Cl.
*G06F 7/00* (2006.01)
(52) U.S. Cl.
USPC .......................................................... 707/705

(58) Field of Classification Search
USPC .......................................................... 707/705
See application file for complete search history.

(56) References Cited

U.S. PATENT DOCUMENTS 5,983,318 A * 11/1999 Willson et al. ................. 711/113
2010/0299701 A1 * 11/2010 Liu et al. ......................... 725/39

FOREIGN PATENT DOCUMENTS

JP            07-311699 A       11/1995

* cited by examiner

*Primary Examiner* — Jensen Hu
(74) *Attorney, Agent, or Firm* — Canon U.S.A., Inc., IP Division

(57) ABSTRACT

A data retrieval apparatus selects data to be retained in a cache so that a cache created in retrieval at a previous stage is reused in retrieval at a later stage, and implements retrieval processing to enhance a reusability of retrieved data and upgrade a response speed.

9 Claims, 14 Drawing Sheets

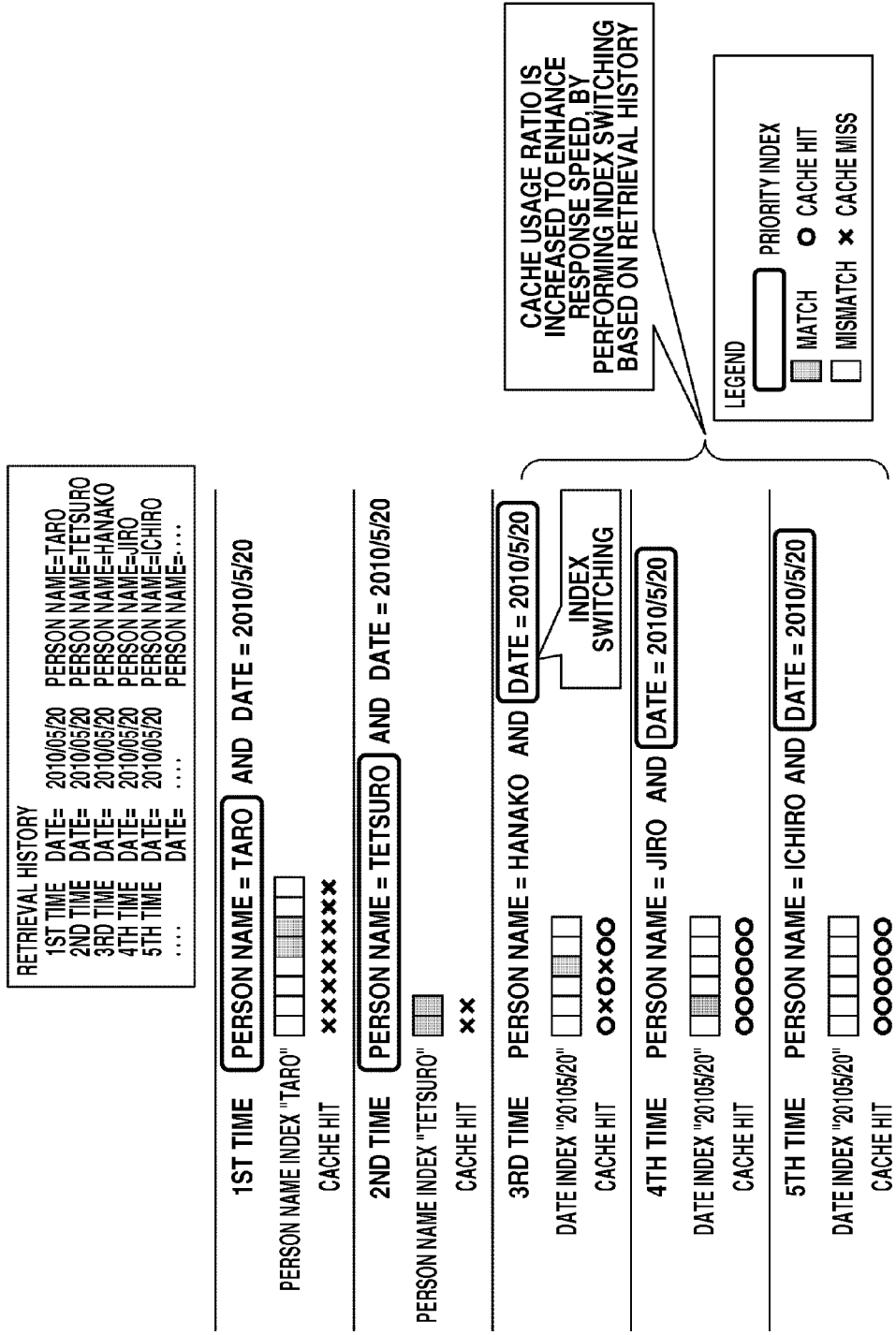

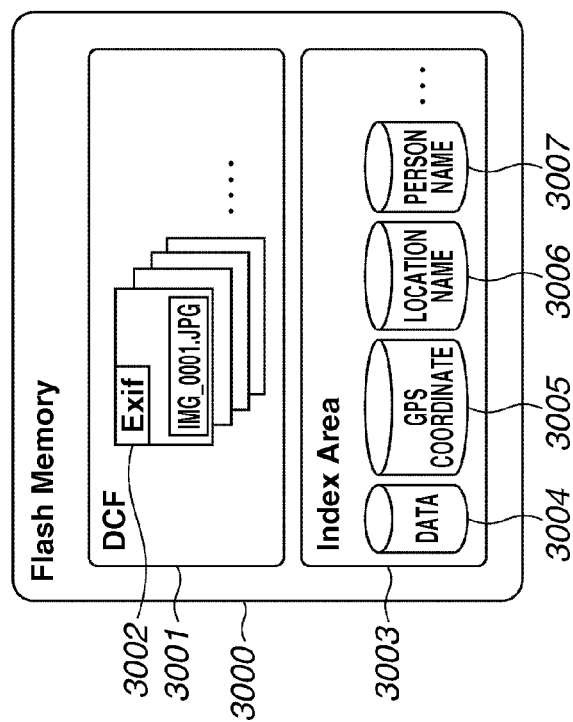
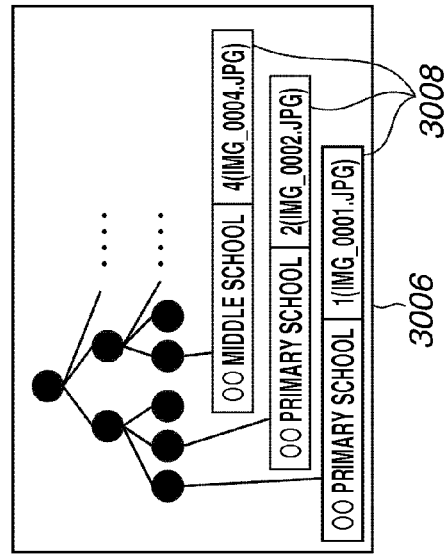

| RowID | FILE NAME | DATE | PLACE NAME | PERSON NAME | EVENT | GPS COORDINATE (ALTITUDE) | GPS COORDINATE (LATITUDE) |
|---|---|---|---|---|---|---|---|
| 1 | IMG_0001.JPG | 2009/10/10 | ○○ PRIMARY SCHOOL | JIRO | ATHLETIC MEETING | 43.084718 | 141.359839 |
| 2 | IMG_0002.JPG | 2009/10/10 | ○○ PRIMARY SCHOOL | JIRO | ATHLETIC MEETING | 43.084718 | 141.359839 |
| 3 | IMG_0003.JPG | 2009/10/11 | ○○ PRIMARY SCHOOL | TARO | ATHLETIC MEETING | 43.084718 | 141.359839 |
| 4 | IMG_0004.JPG | 2010/04/07 | ○○ MIDDLE SCHOOL | TARO | ENTRANCE CEREMONY | 43.082743 | 141.360569 |
| 5 | IMG_0005.JPG | 2010/05/03 | ○○ SEASHORE | TARO | GW | 43.20968 | 141.294479 |
| 6 | IMG_0006.JPG | 2010/05/03 | ○○ SEASHORE | HANAKO | GW | 43.20968 | 141.294479 |
| 7 | IMG_0007.JPG | 2010/05/04 | ○○ SERVICE AREA | ICHIRO | GW | 42.95014 | 141.716938 |
| 8 | IMG_0008.JPG | 2010/05/04 | ○○ SERVICE AREA | ICHIRO | GW | 42.95014 | 141.716938 |
| 9 | IMG_0009.JPG | 2010/05/04 | ○○ MUSEUM | NON | GW | 42.676759 | 143.164319 |
| 10 | IMG_0010.JPG | 2010/05/04 | ○○ MUSEUM | TARO | GW | 42.676759 | 143.164319 |
| 11 | IMG_0011.JPG | 2010/05/20 | HOME | TARO | BIRTHDAY PARTY | 43.07848 | 141.364861 |
| 12 | IMG_0012.JPG | 2010/05/20 | HOME | JIRO | BIRTHDAY PARTY | 43.07848 | 141.364861 |
| 13 | IMG_0013.JPG | 2010/05/20 | HOME | TETSURO | (NON) | 43.07848 | 141.364861 |
| 14 | IMG_0014.JPG | 2010/05/20 | HOME | HANAKO | (NON) | 43.07848 | 141.364861 |
| 15 | IMG_0015.JPG | 2010/05/20 | HOME | TARO | (NON) | 43.07848 | 141.364861 |
| 16 | IMG_0016.JPG | 2010/05/20 | HOME | TETSURO | (NON) | 43.07848 | 141.364861 |
| 17 | IMG_0017.JPG | 2010/05/24 | ○○ PARK | NON | (NON) | 43.121284 | 141.426659 |
| 18 | IMG_0018.JPG | 2010/05/24 | ○○ PARK | NON | (NON) | 43.121284 | 141.426659 |
| 19 | IMG_0019.JPG | 2010/05/24 | ○○ PARK | TARO | (NON) | 43.121284 | 141.426659 |
| 20 | IMG_0020.JPG | 2010/05/24 | ○○ PARK | NON | (NON) | 43.121284 | 141.426659 |
| 21 | IMG_0021.JPG | 2010/05/24 | ○○ PARK | TARO | (NON) | 43.121284 | 141.426659 |
| 22 | IMG_0022.JPG | 2010/05/24 | ○○ PARK | NON | (NON) | 43.121284 | 141.426659 |

FIG.5B

| DATE | RowID |
|---|---|
| 2009/10/10 | 1 |
| 2009/10/11 | 2 |
| 2009/10/11 | 3 |
| 2010/04/07 | 4 |
| 2010/05/03 | 5 |
| 2010/05/03 | 6 |
| 2010/05/04 | 7 |
| 2010/05/04 | 8 |
| 2010/05/04 | 9 |
| 2010/05/04 | 10 |
| 2010/05/20 | 11 |
| 2010/05/20 | 12 |
| 2010/05/20 | 13 |
| 2010/05/20 | 14 |
| 2010/05/20 | 15 |
| 2010/05/20 | 16 |
| 2010/05/24 | 17 |
| 2010/05/24 | 18 |
| 2010/05/24 | 19 |
| 2010/05/24 | 20 |
| 2010/05/24 | 21 |
| 2010/05/24 | 22 |

3004

| PERSON NAME | RowID |
|---|---|
| NON | 9 |
| NON | 17 |
| NON | 18 |
| NON | 20 |
| NON | 22 |
| ICHIRO | 7 |
| ICHIRO | 8 |
| HANAKO | 6 |
| HANAKO | 14 |
| JIRO | 1 |
| JIRO | 2 |
| JIRO | 12 |
| TARO | 3 |
| TARO | 4 |
| TARO | 5 |
| TARO | 10 |
| TARO | 11 |
| TARO | 15 |
| TARO | 19 |
| TARO | 21 |
| TETSURO | 13 |
| TETSURO | 16 |

| NUMBER OF TIMES OF RETRIEVALS | RowID | FILE NAME | DATE | PLACE NAME | PERSON NAME | EVENT | GPS COORDINATE (ALTITUDE) | GPS COORDINATE (LATITUDE) |
|---|---|---|---|---|---|---|---|---|
| 1ST TIME | (NON DESIGNATED) | (NON DESIGNATED) | 2010/05/20 | (NON DESIGNATED) | TARO | (NON DESIGNATED) | (NON DESIGNATED) | (NON DESIGNATED) |
| 2ND TIME | (NON DESIGNATED) | (NON DESIGNATED) | 2010/05/20 | (NON DESIGNATED) | TETSURO | (NON DESIGNATED) | (NON DESIGNATED) | (NON DESIGNATED) |
| 3RD TIME | (NON DESIGNATED) | (NON DESIGNATED) | 2010/05/20 | (NON DESIGNATED) | HANAKO | (NON DESIGNATED) | (NON DESIGNATED) | (NON DESIGNATED) |
| 4TH TIME | (NON DESIGNATED) | (NON DESIGNATED) | 2010/05/20 | (NON DESIGNATED) | JIRO | (NON DESIGNATED) | (NON DESIGNATED) | (NON DESIGNATED) |
| 5TH TIME | (NON DESIGNATED) | (NON DESIGNATED) | 2010/05/20 | (NON DESIGNATED) | ICHIRO | (NON DESIGNATED) | (NON DESIGNATED) | (NON DESIGNATED) |
| ..... | ..... | ..... | ..... | ..... | ..... | ..... | ..... | ..... |

SELECT * FROM DCIM_TABLE WHERE PERSON_NAME = ? AND DATE = ?

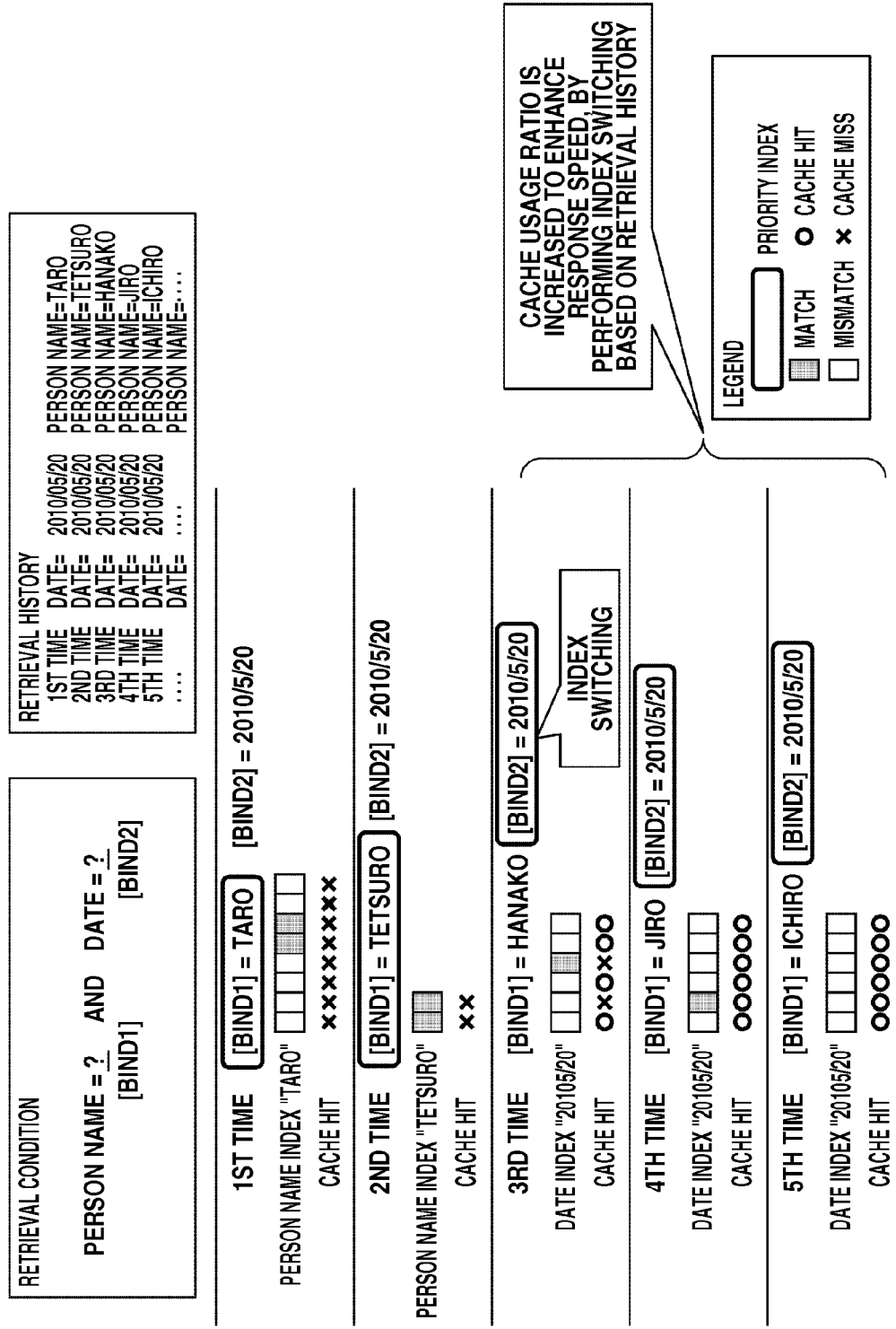

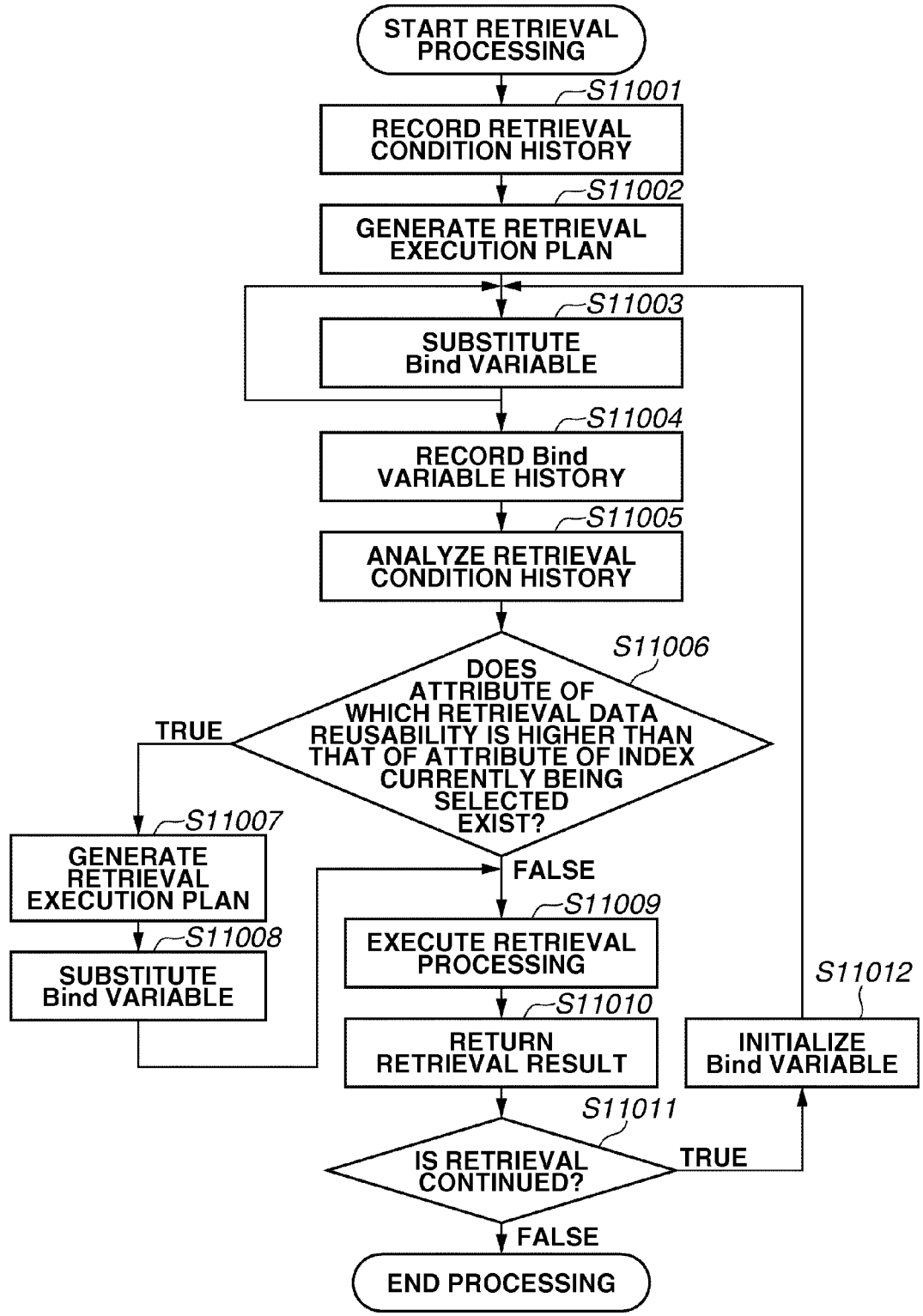

DATA RETRIEVAL APPARATUS, DATA RETRIEVAL METHOD, AND PROGRAM

BACKGROUND OF THE INVENTION

1. Field of the Invention

The present invention relates to a data retrieval apparatus and a data retrieval method that performs high-speed retrieval processing by use of a database engine.

2. Description of the Related Art

Along with increase in flash memory capacity in recent years, even resource-constrained devices such as a digital camera or a photo frame, an inkjet multifunctional peripheral and the like, in which there is a limit to computational resources, have come to have enough storage capacity to save several tens of thousands to several hundreds of thousands of data sheets. Further, an improvement of recognition technology enables providing a diversity of attribute values such as person names or location names.

There is a growing need to perform a wide variety and a large amount of data retrievals at high-speeds using these attribute values, even in the resource-constrained devices. In a case of photo data, attribute values such as dates, shooting parameters, Global Positioning System (GPS) coordinates serving as position information, etc., are assigned during shooting. Attribute values such as favorite degrees or printing specifications are assigned during reproduction. A typical format used to store these attribute values is the Exchangeable image file format. These attributes are useful in retrieving a user's desired data. However, in a case where data is retrieved and attribute values are of a wide variety and in a large amount, performing a total scanning on all pieces of data to perform the retrieval processes requires an enormous calculation amount, and accordingly causes delay of a response time.

Thus, in order to perform retrievals at a high speed, as a common approach, a response time is shortened by keeping an index built in advance that contains index information and using the index during retrieval. If a plurality of indexes can be used, a predetermined index will be selected and used. Selecting an index to be preferentially used, depending on a retrieval condition, becomes important for enhancement of a response speed. For example, in selecting the index, a rule that is generally used does not consider a hit ratio of a cache which retains the index, such as preferentially using a column having a small number of data and a high refinement effect.

However, when retrieval is repeatedly implemented, data reading from a database file is frequently performed, and a hit ratio of the cache greatly influences the response speed. This is because a transfer speed of an external storage unit in which the database file is placed is slower compared with that of a random-access memory (RAM) serving as a main storage, and frequent data reading degrades a computing performance of the entire apparatus. Generally, in order to address the problem, read and write frequency is suppressed by providing an intermediate layer such as the caching mechanism in the RAM or the main storage unit, but the caching mechanism has a small capacity because of the restrictions of computational resources in the resource-constrained device, which particularly influences the performance. For example, in a digital camera or the like, metadata is synchronized and updated between a personal computer (PC) and a camera. As a result, records of a large number of data are retrieved and updated, a hit ratio of the cache drops, and data reading from the database file frequently occurs.

Conventionally, as a retrieval method which focuses on a retrieval index selection method, for example, as discussed in Japanese Patent Application Laid-Open No. 07-311699, a method for selecting an index using analysis results such as data distribution in advance, or rebuilding a database file so that retrieval cost becomes low are available.

However, conventional methods such as the above-described example are premised on an operation in a PC or a server with abundant resources. An advance analysis of data distribution or rebuilding of the database file is not suitable for a resource-constrained device with limited computational resources. For this reason, index selection control must be performed in response to an instructed retrieval condition without relying on computational resources, regardless of the distribution of data in the resource-constrained device. It may be possible to perform analysis processing or rebuilding processing during standby time, but in many cases there is a limit to an electric power or computation ability.

SUMMARY OF THE INVENTION

An aspect of the present invention is directed to enhancing response performance, and increasing convenience of retrieval function, even in a resource-constrained device in which advance analysis processing of data distribution, and rebuilding processing of a database file are difficult to perform.

According to an aspect of the present invention, a data retrieval apparatus includes a retrieval condition input unit configured to accept a retrieval condition including an attribute and an attribute value, a holding control unit configured to cause a holding unit to retain data acquired from a database corresponding to the retrieval condition, and an analysis unit configured to analyze a hit ratio as reusability of data of the holding unit from a number of usage times of the attribute value accepted for the retrieval condition. The holding control unit causes the holding unit to preferentially retain the data which is analyzed found to have the reusability by the analysis unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example in which the effect of the exemplary embodiment is achieved.

FIGS. 3A, 3B, and 3C illustrate a flash memory card used in the exemplary embodiment, a typical example of attribute values of an Exif as a data example, and an example of B-Tree index.

FIGS. 5A, 5B, and 5C illustrate an example of retrieval target data used in the exemplary embodiment, an example of an index of the retrieval target data, and an example of a retrieval history.

FIG. 10 illustrates an example in which the effect of an exemplary embodiment is seen.

FIG. 11 is a flowchart illustrating a flow of processing of an exemplary embodiment.

DESCRIPTION OF THE EMBODIMENTS

Various exemplary embodiments, features, and aspects of the invention will be described in detail below with reference to the drawings.

Figure 1:
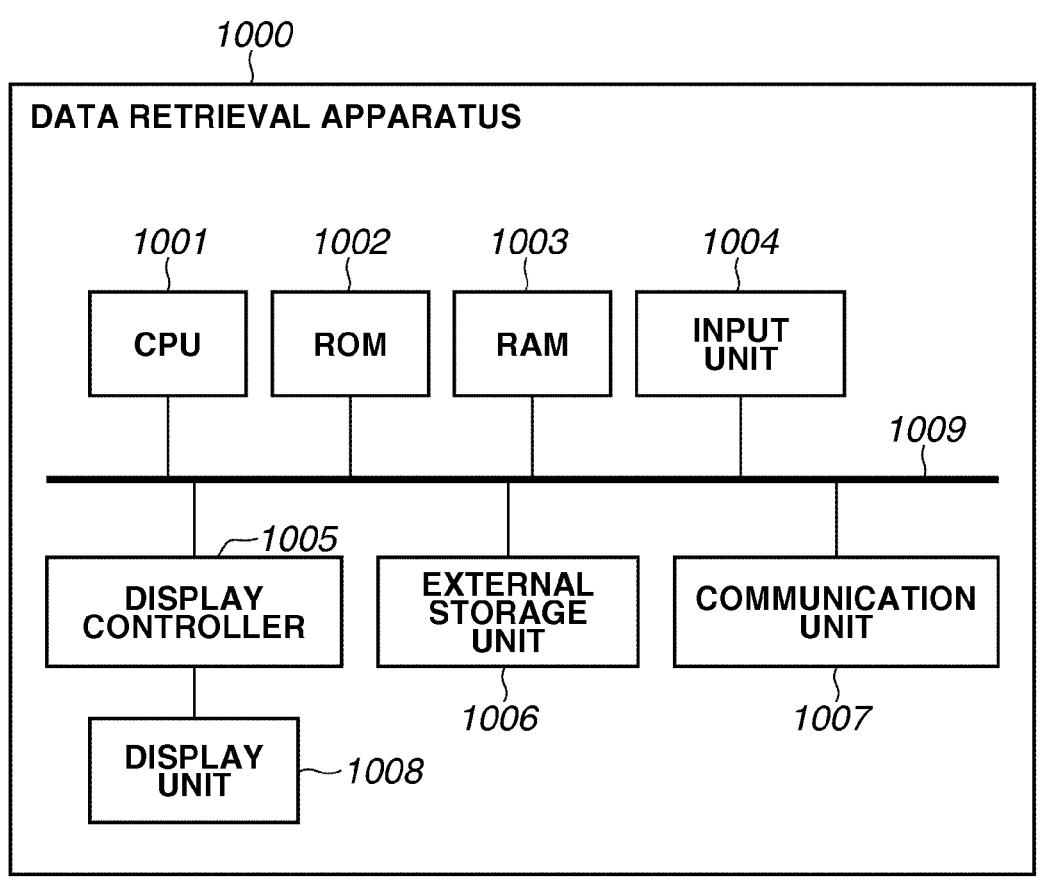
FIG. 1 is a diagram illustrating a configuration of principal parts involved in control of a data retrieval apparatus according to an exemplary embodiment.

FIG. 1 is a configuration diagram of a data retrieval apparatus 1000 according to an exemplary embodiment A microprocessor central processing unit (CPU) 1001 performs calculation and logical determination for information processing. The CPU 1001 controls via a system bus 1009 each component connected to the bus. A read-only fixed memory (ROM) 1002 stores a control program code such as a processing program implemented in the present exemplary embodiment. A writable random-access memory (RAM) 1003 is used for temporary storage of various types of data from each component. An input unit 1004 receives instructions from a source external to the data retrieval apparatus 1000, such as a user.

The data retrieval apparatus 1000 further includes a display unit 1008, such as a liquid crystal panel, displays image information, the display of which is controlled by a display controller 1005. Various types of data and image information are stored in an external storage unit 1006. A memory card, a hard disk drive (HDD), a digital versatile disk ROM (DVD-RAM), or the like can be used as a storage medium that stores this data and image information. A communication unit 1007 connects the data retrieval apparatus 1000 with other devices.

The data retrieval apparatus 1000 operates according to various types of inputs from the input unit 1004 and various types of inputs supplied from the communication unit 1007 via a network. When an input from the input unit 1004 or an input from the communication unit 1007 is supplied, first, an interrupt signal is sent to the CPU 1001. Then, the CPU 1001 reads out various types of control signals stored in the ROM 1002, the RAM 1003, the external storage unit 1006, and performs various types of controls in accordance with these control signals.

FIG. 2 illustrates an example in which the effect of the present exemplary embodiment is achieved. In this example, retrieval occurs by combining a "date" and a "person name" under an "AND" condition and is repeatedly implemented by changing the attribute value of the "person name" while keeping the attribute value of the "date" the same. By fixing the "date" and changing the "person name" allows a user to retrieve photos of different individuals that were shot on the same date.

By giving priority to an attribute value of the "person name" at the beginning, a higher refinement effect is achieved, the database engine creates an execution plan using a "person name" index, and performs retrieval processing ($1^{st}$ time, $2^{nd}$ time, etc.). The execution plan describes a plan of how to implement retrieval processing in what procedure within the database engine. Generally, if an index is used with respect to attributes which show scattered data distribution, a retrieval speed is enhanced. Although there is a limit to dates, it is considered that attribute values of the "person name", which are objects of shooting, are more scattered than those of location names. Therefore, a "person name" index is selected in the retrieval at $1^{st}$ time.

Subsequently, when the database engine determines that a "date" index has a higher reusability of the database cache at a stage ($3^{rd}$ time) when it is detected that the "date" has been fixed, the database engine recreates an execution plan switched to the "date" index, and performs retrieval processing. As a result, in a system in which similar attribute values are specified and retrieval is continuously implemented, a possibility increases that an index read in the retrieval processing at a previous stage will be reused in the retrieval at a later stage, and retrieval response speed can be upgraded.

The details of components and an operating principle for realizing the above-described exemplary embodiment will be described below.

FIG. 3A illustrates an internal configuration of a memory card for digital cameras as an example of the external storage unit. Various types of data, such as photos or video pictures, are stored in the memory card 3000 in a format complying with a Design rule for Camera File system (DCF) 3001. Further, attribute values, which are additional information explaining contents of the data, are assigned to each of the data items. In a case of photo data, a typical example is an Exchangeable image file format (Exif) 3002, which is a format used to store dates or shooting parameters, GPS coordinates, etc. FIG. 3B illustrates an example of the attribute values associated with EXIF formatted data.

In order to enable retrieval processing to be performed at high speeds, various types of indexes 3004 to 3007 which store index information are built in advance in an index storage area 3003. A response time is shortened, in general, by using the built indexes during retrieval. The indexes have a data structure such as B-Tree or hashing, and high-speed retrievals become possible by associating retrieval keys and data with each other. In the index storage area 3003, a date index 3004, a GPS coordinates index 3005, a location name index 3006, and a person name index 3007 are stored.

FIG. 3C illustrates the location name index 3006 which has a structure of the B-Tree index. The B-Tree index is an index having a hierarchical structure, and has a feature that insertion, retrieval, and deletion of the data can be readily performed. Index records 3008 represent index records from location names to data file names.

Figure 4A:
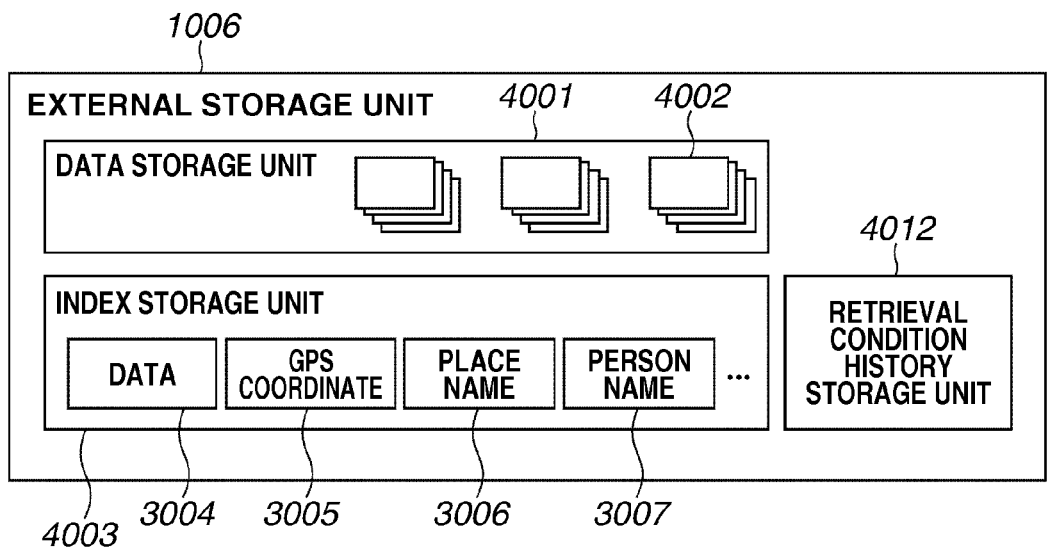
FIGS. 4A, 4B, and 4C are functional block diagrams of elements of the data retrieval apparatus according to the exemplary embodiment.

FIG. 4A is a configuration diagram of the external storage unit 1006 according to the present exemplary embodiment. The external storage unit 1006 includes a data storage unit 4001, an index storage unit 4003, and a retrieval condition history storage unit 4012. Each of data 4002 stored in the data storage unit 4001 is data generated by shooting, scanning, and transferring data from outside the data retrieval apparatus 1000. The index storage unit 4003 is used to store the respective indexes 3004 to 3007 generated by a data base engine 4005 and a retrieval application 4009 described below, and is arranged in the external storage unit 1006. The data storage unit 4001 and the data storage unit 3001, each of data 4002 and data 3002, and the index storage area 3003 and the index storage unit 4003 fulfill the same functions.

Figure 4B:
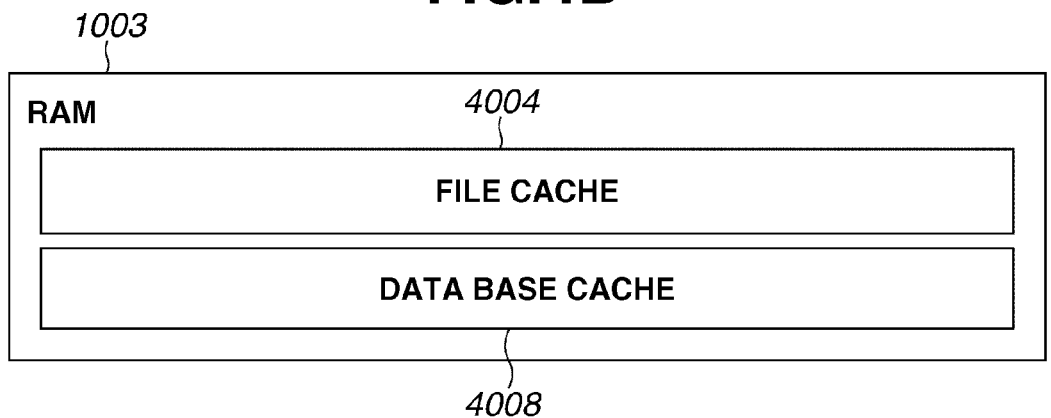

FIG. 4B is a diagram representing a configuration of the RAM 1003. The RAM 1003 includes a file cache 4004 and a database cache 4008. The file cache 4004 is operable to receive and deliver access request data from and to the external storage unit 1006, and is arranged to enhance the response speed with respect to requests from the database engine 4005 and the retrieval application 4009.

Figure 4C:
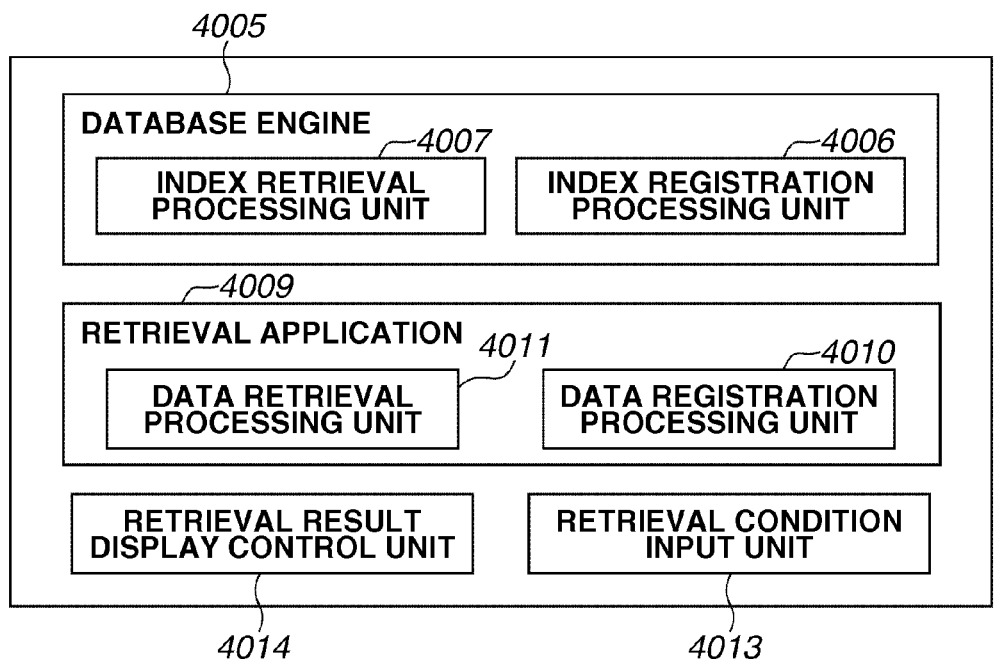

FIG. 4C is a functional block diagram according to the present exemplary embodiment. A retrieval condition input unit 4013 accepts retrieval instructions from a user. A retrieval result display control unit 4014 presents a retrieval result to the user, according to the provided retrieval instructions. The database engine 4005 performs retrieval processing at high speeds.

The database engine 4005 implements an index registration processing unit 4006 and an index retrieval processing unit 4007, and obtains processing results thereof. The database cache 4008 is used to upgrade the response speeds of the retrieval processing and the register processing. The database cache 4008 is arranged in the middle of the retrieval application 4009 and the data storage unit 4001/the index storage unit 4003, and serves as a buffer for lowering access frequency to the external storage unit 1006, by securing a certain amount of once-accessed data on the RAM 1003.

The retrieval application 4009, which implements retrieval processing of the data retrieval apparatus 1000, includes a data registration processing unit 4010 and a data retrieval processing unit 4011. The data retrieval processing unit 4011 implements retrieval processing in accordance with retrieval instructions received from the retrieval condition input unit 4013, and performs processing for returning a result of the retrieval processing to the retrieval result display control unit 4014.

The data registration processing unit 4010 is implemented when data is added/deleted, and registers/deletes the data on/from the data storage unit 4001. Further, the data registration processing unit 4010 calls up the index registration processing unit 4006, and updates the indexes 3004 to 3007 necessary for speedup of the retrieval processing, and performs processing for storing the respective indexes 3004 to 3007 in the index storage unit 4003.

A data table 5001 in FIG. 5A is an example of a retrieval database according to the present exemplary embodiment. Row identifications (RowIds) are assigned as keys for uniquely discriminating among respective pieces of data, and are saved in a table form in the database file or the like. The RowIds are numeric values uniquely numbered and assigned so that they are not duplicated in the database or table, and are used in a common database engine.

FIG. 5B is an example of indexes stored in the index storage unit 4003 according to the present exemplary embodiment. Indexes of the Exif data 3002 assigned to each data 4002 are created in advance by the index registration processing unit 4006, so that the data which matches the retrieval condition can be discovered quickly and retrieval processing can be implemented at high speeds. For example, the date index 3004 holds a data map which combines dates with RowIds, and the person name index 3007 holds a data map which combines person's names with RowIds. The data can be uniquely identified from the combined RowIds, and retrieval results can be presented.

FIG. 5C is an example of retrieval condition history stored in the retrieval condition history storage unit 4012. A history of the retrieval conditions can be specified and referred to by the user.

Figures 6A, 6B:
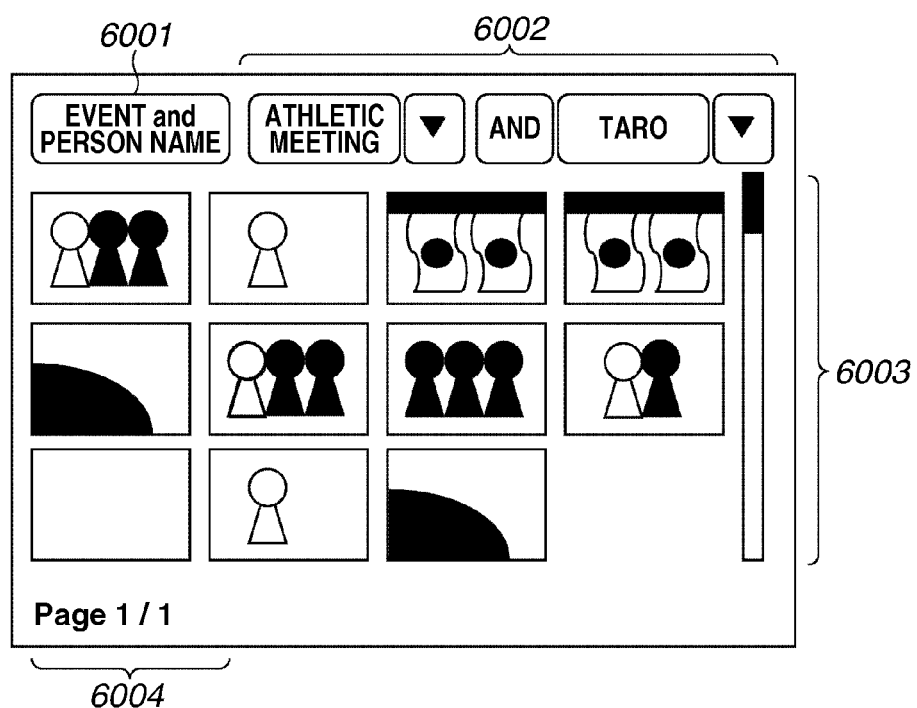
FIGS. 6A and 6B illustrate an example of an SQL sentence which describes retrieval instruction used in the exemplary embodiment, and a screen when retrieval processing is implemented.

FIG. 6A is an example of a structured query language (SQL) statement which describes retrieval instruction from the user according to the present exemplary embodiment. The SQL statement is created by the retrieval condition input unit 4013 or the like according to the retrieval condition which the user has specified. The created SQL statement is interpreted and implemented by the index retrieval processing unit 4007, and the data retrieval processing is performed. In the example illustrated in FIG. 6A, bind variables "?" for converting retrieval condition values into variables are specified. By making use of the bind variables, the retrieval condition can be dynamically changed without repeatedly creating the SQL statements. As a result, the retrieval processing can be performed at high speeds.

FIG. 6B is an example of a user interface provided by the retrieval result display control unit 4014 for displaying retrieval results. An area 6001 is a retrieval condition display area. A box 6002 is a drop-down box for selecting the retrieval condition. Further, an area 6003 is a retrieval result display area for displaying thumbnail images associated with a list of the retrieval results obtained based on the retrieval condition. An area 6004 is a retrieval information display area where a number of pages of the retrieval results is provided.

Next, an example of an operation based on the above-described configurations will be described below.

First, retrieval function using indexes will be described. Each of data 4002 is stored in the data storage unit 4001 by the data registration processing unit 4010 of the retrieval application 4009. Further, each of indexes 3004 to 3007 are created by the index registration processing unit 4006 of the database engine 4005. In this state, retrieval instructions from the user are delivered to the retrieval application 4009 by the retrieval condition input unit 4013, and the data retrieval processing unit 4011 is implemented. At this time, if a plurality of the indexes used for the retrieval can be utilized (e.g., the date index 3004 or the GPS coordinate index 3005), the order of data scan processing within the database engine is varied depending on the indexes to be used. Since data amounts or data distributions stored in the indexes are different for each attribute, even if finally obtained results are the same, cost/response time necessary for the retrieval vary depending on a selection method of indexes. Therefore, when the data retrieval processing unit 4011 calls the database engine 4005, and implements the index retrieval processing unit 4007, it is important for the database engine 4005 to estimate and select indexes by which the retrieval cost and the response time is the smallest.

An access speed to the external storage unit 1006 (e.g., an HDD, a flash memory), in which a database file is placed, is generally slower as compared with an access speed to the RAM 1003. For this reason, in order to shorten the response times of input and output of the external storage unit 1006, the operating system of a particular device sets up the file cache 4004, which temporarily retains the data which is used at a high frequency, and a file pre-reading mechanism in the RAM 1003. However, especially in an embedded device such as a digital camera which has restrictions on computational resources, these functions cannot be fully utilized. For this reason, it is important that the database engine decreases access frequencies to the data storage unit 4001 and the index storage unit 4003 as much as possible. In order to decrease the access frequencies to the data storage unit 4001 and the index storage unit 4003, when implementing the index registration processing unit 4006 and the index retrieval processing unit 4007, the data base engine 4005 has its own buffer, i.e., the database cache 4008. However, similarly to the file cache mechanism, embedded devices have restrictions on the resources. As a result, the buffer cannot be sufficiently prepared, and it is necessary to enhance reusability, which is expressed by a hit ratio of the database cache or the like with limited resources. A hit ratio of the cache can be computed with, for example, a denominator (a number of access requests), and a numerator (a number of times that an access target remains in the cache).

The database engine 4005, when implementing retrieval processing, assesses computation cost necessary for the retrieval processing based on a preset rule or guess from the registered data distribution, estimates and selects an index by which the cost becomes smallest, and implements the retrieval processing. For example, in a retrieval combining a "person name" and "date", as illustrated in FIG. 6A, generally the "person name" has a smaller number of attributes as compared with the "date", and there is a high possibility that they are scattered in DB file. For this reason, by giving priority to the person name index over the date index, a number of candidates as retrieval results becomes less, and quicker refinement of the data is expected. Therefore, the database engine 4005 implements retrieval processing by using preferentially the person name index 3007, and the retrieval application 4009 receives retrieval result. Then, the retrieval result display control unit 4014 receives processing result of the retrieval application 4009 and presents the retrieval result as illustrated in FIG. 6B to the user.

However, in a case of continuously retrieving a plurality of times while fixing the retrieval value of the date, and changing only the retrieval values of the person names, the data scattered in the DB file will be repeatedly scanned, when priority is given to the person name index. As a result, reusability of both the database cache and file cache falls to a low level, and discontinuous disk accesses frequently occur and the response speed becomes slow. Especially, in a case where a cache size is small, response speed degradation due to discontinuous disk accesses often outweighs the speeding-up effect achieved by lessening the retrieval candidates. In a case of executing retrieval while for example fixing the date condition "2010/5/20", and changing the person names each time, accesses to the data storage unit 4001 occur discontinuously, when priority is given to the indexes of the person names which take discontinuous values. The effects of both the database cache and the file cache cannot be obtained, resulting in degradation of the response speed.

In order to solve the above-described problem, the present exemplary embodiment records a history of the retrieval conditions as illustrated in a retrieval condition history 5002 and enhances the reusability of the database cache by use of the history to improve the response speed. More specifically, the present exemplary embodiment refers to the history of the retrieval values, and when iterations of identical values, or similar values have been detected in the retrieval conditions designated to the respective attributes and makes a change so that an index is preferentially used in which the iterations have been detected.

Figure 7:
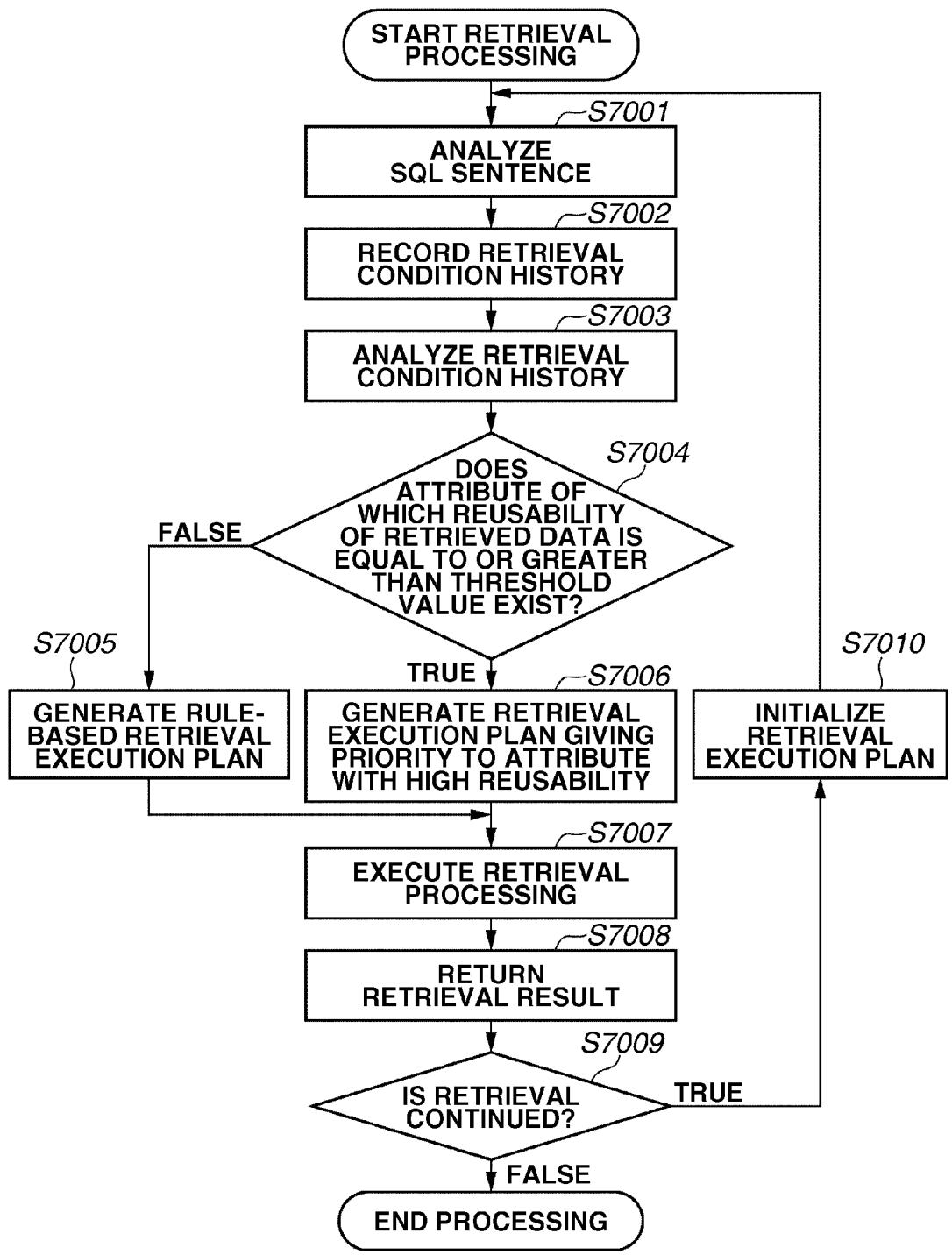
FIG. 7 is a flowchart illustrating a flow of processing of an exemplary embodiment.

The details of the present exemplary embodiment will be described with reference to the flowchart of the database engine 4005 illustrated in FIG. 7.

First, in step S7001, the database engine 4005 analyzes the SQL statement issued by the retrieval application 4009. Subsequently in step S7002, the database engine 4005 records the analyzed retrieval condition in the retrieval condition history storage unit 4012. In step S7003, the database engine 4005 performs acquisition/analysis of the recorded retrieval condition history, and computes and determines a hit ratio as a measure of reusability of the database cache with regard to each attribute which is a retrieval target. The hit ratio can be computed with, for example, a denominator:a number of access requests, and a numerator:a number of times that an access target remains in a cache. In step S7004, the database engine 4005 determines whether an attribute having a hit ratio of the database cache which is equal to or greater than a threshold value exists, based on the analysis result. If any attribute does not have a hit ratio which exceeds the threshold value (FALSE in step S7004), in step S7005, the database engine 4005 creates an execution plan based on a preset rule. Further, if there exists an attribute having a hit ratio which exceeds the threshold value (TRUE in step S7004), in step S7006, the database engine 4005 creates a retrieval execution plan so that a retrieval execution procedure corresponding to the retrieval condition enhances the reusability of the database cache. More specifically, for the $2^{nd}$ time and beyond in a loop, the execution plan will be recreated according to the reusability, even if the same query is implemented.

At this time, the database engine 4005 recreates the execution plan by utilizing preferentially an index of an attribute having a high reusability of the database cache. As an element to be considered in the creation of the execution plan other than the index, a configuration considering a start position of an internal cursor, which is used in database file scan processing, is also useful. The internal cursor is used for the database engine to scan the database, and the start position of the internal cursor is used to determine a point for starting scanning of the database. If the data distribution is stored when scanning is performed in the retrieval at a previous stage, and if a start position is determined on the basis of the distribution information, the scan processing can be omitted. By doing so, as an effect, upgrading of the response speed is expected. For example, scanning of portions where scanning is carried out in retrieval processing at the previous stage can be omitted in a case where similar retrieval conditions continue.

When the retrieval execution plan is defined, in step S7007, the database engine 4005 implements retrieval processing. In step S7008, the database engine 4005 returns a retrieval result to the retrieval application 4009. In step S7009, the database engine 4005 determines whether retrieval is continued according to an instruction of the retrieval application 4009. If the retrieval is continued (TRUE in step S7009), the database engine 4005 shifts to step S7010 to perform necessary initialization processing, and again returns to step S7001. When the above processing is repeatedly implemented, the retrieval processing with a high reusability of the database cache is implemented, and it becomes possible to upgrade the response speed in steps S7007 and S7008.

Figure 8:
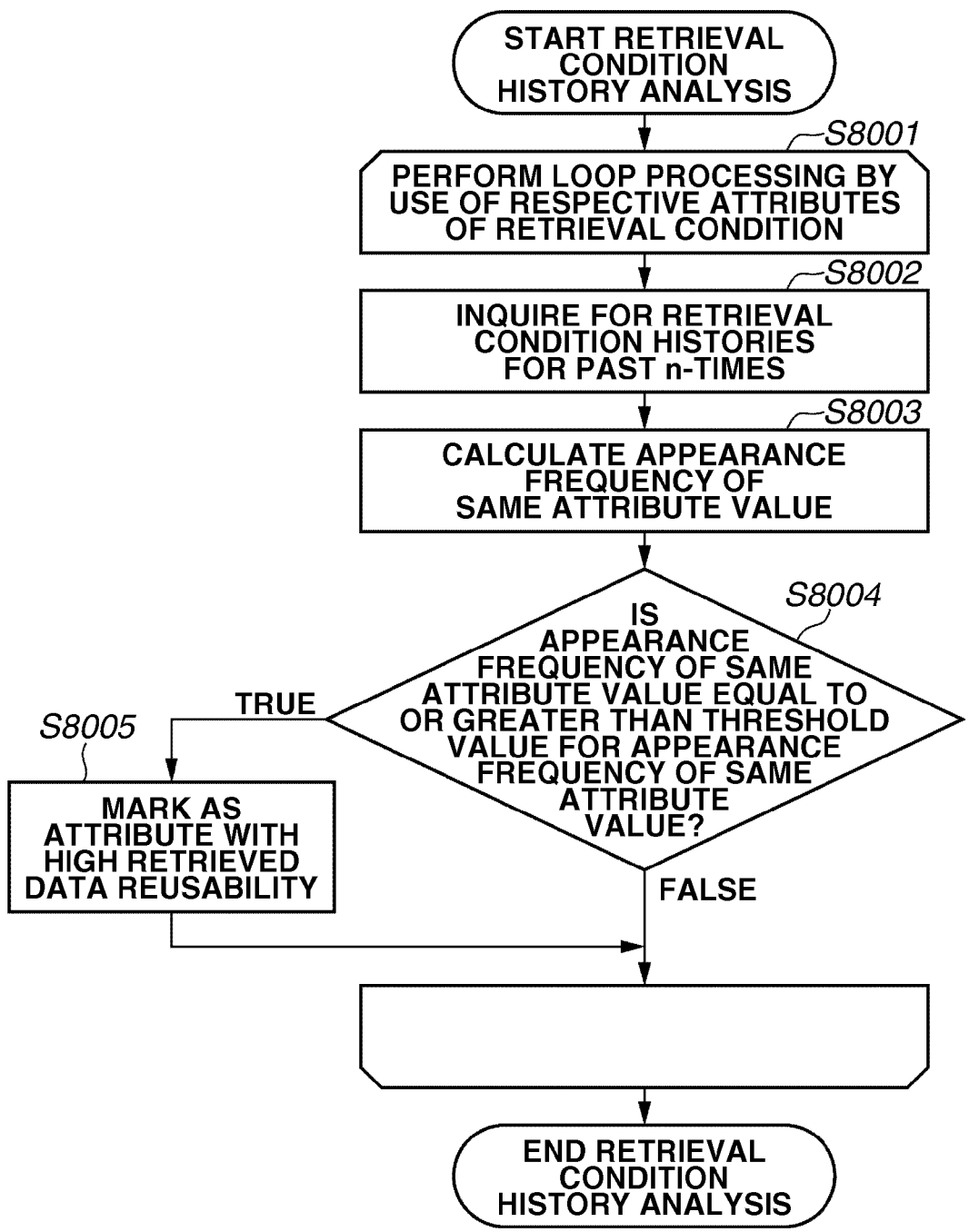
FIG. 8 is a flowchart illustrating a flow of retrieval condition history analysis using appearance frequency of an identical attribute value.

As a criterion for determining the reusability of the database cache, appearance frequency of an identical attribute value of the retrieval condition is firstly cited. Illustration in FIG. 8 is the details of step S7003 when the appearance frequency of identical attribute value is used. Step S7003 in a case of using appearance frequency of identical attribute value is composed of steps S8002 to S8005, and loop processing is performed with regard to each attribute. In step S8002, the database engine 4005 inquires retrieval condition history for the past n-times. In step S8003, the database engine 4005 analyzes the attribute values and computes appearance frequencies of the respective attribute values specified for the retrieval conditions. Since there is a plurality of attribute values with respect to each attribute, a plurality of appearance frequencies exists with respect to each attribute. The highest one or its equivalent among the calculated appearance frequencies is regarded as a representative appearance frequency of the attribute. In step S8004, the database engine 4005 compares the representative appearance frequency with a threshold value for appearance frequency of identical attribute value. If the representative appearance frequency is equal to or greater than the threshold value (TRUE in step S8004), the database engine 4005 shifts to step S8005 and marks it as an attribute with a high reusability of the retrieved data. If otherwise (FALSE in step S8004), no action is taken. This is because, in a system in which identical attribute value is specified at high frequencies as the retrieval condition value, it can be expected that saving positions of expected retrieval results are concentrated on the periphery of the retrieval results at the previous stage.

Figure 9:
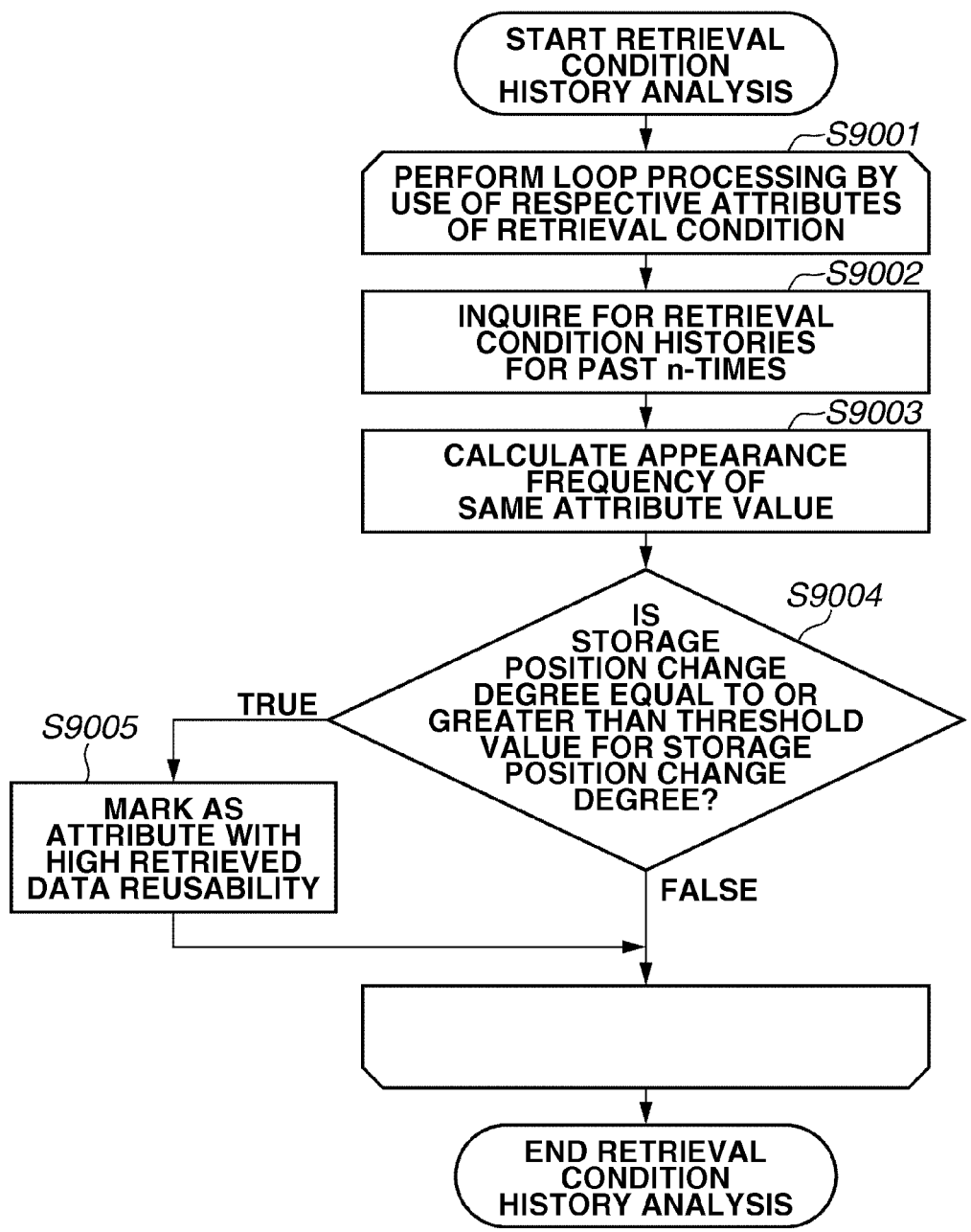
FIG. 9 is a flowchart illustrating a flow of retrieval condition history analysis using degree of storage position change.

Not only a maximum value of appearance frequencies, but also an average value of appearance frequencies, can be used as the above-described representative appearance frequency of the attribute. For example, assuming that appearance frequencies of person name A is 10 times, person name B is one time, location name C is 9 times, and location name D is 8 times, a representative appearance frequency of person names is 10 times when using a maximum value, 5.5 times when using an average value, while a representative appearance frequency of location names is 9 times when using a maximum value, 8.5 times when using an average value. It can be seen that the attribute of the location name is an attribute with a high reusability. Thus, if a number of histories of the retrieval conditions becomes large, as its effect, a user's retrieval intention can be more accurately read As another criterion for determining reusability of the database cache described above, it is also conceivable to measure with respect to each attribute, a degree of storage position change within the index, of the data that matches the retrieval condition, and to use an attribute with a small degree of the position change as the one with a high reusability. Enhancement of reusability of the retrieved data can be expected, when priority is given to an attribute with a small degree of the storage position change. Illustration in FIG. 9 is the details of step S7003 when using degree of change of the storage positions. Step S7003 when using degree of change of the storage positions is composed of step S9002 to S9005, and loop processing is performed with regard to each attribute, similarly to the flow in FIG. 8. The difference from the flow chart in FIG. 8 is steps S9002 and S9003. The different point is determining an attribute with a high reusability of the retrieved data, by using degree of the storage position change within an index, in place of appearance frequency of identical attribute value. Also in this case, it can be expected that retrieval results in the next time and beyond will be concentrated on the periphery of the matching data at the previous stage.

In both methods illustrated in FIG. 8 and FIG. 9, upgrading of the response speed is expected, assuming that the retrieval condition, generally specified by the user or the retrieval application, has a fixed context and is continuously implemented.

By performing such processing, the effect can be expected, for example, in a situation in FIG. 2. By determining based on the history that there is no change of date condition "2010/5/20" as the retrieval condition, and switching to the execution plan which uses a date index from $3^{rd}$ time, the reusability of the database cache from then on is enhanced, and improvement of the response speed can be expected. Further, the effect of the file cache can be achieved by suppressing discontinuous accesses, and the reusability of the database cache is enhanced, thereby decreasing file accesses itself.

The above-illustrated processing can be realized without depending on analysis processing such as advance data distribution, and the user or the retrieval application implements optimization processing with less load in consideration of the context to be implemented. When implementing the processing, it is also possible to vary a number of histories to be referred to during retrieval history analysis or a number of attributes of analysis targets, depending on computational resources or processing loads, and to adjust processing loads of the retrieval condition history analysis. Thus, the present invention can be applied even in an environment where computational resources are not abundant. Of course, by statically analyzing the retrieval conditions of queries to be implemented in advance, in an environment such as PC where computational resources are abundant, optimization making use of these retrieval conditions and the present exemplary embodiment may be carried out in combination.

By performing index creation and analysis of data distribution on a huge amount of images implemented in advance by a PC or the like, data retrieval which is difficult to realize with a resource-constrained device only in terms of computational resources also becomes possible. Further, as a retrieved data reusing means, it is also effective to avoid random accesses to the external storage unit, by sorting intermediate results or the like of the retrieval processing and keeping them temporarily saved in the external storage unit instead of the database cache, and reusing them during retrieval.

Next, as a second exemplary embodiment of the present invention, a retrieval processing method in a case where a bind variable exists in the SQL statement given as the retrieval condition will be described in detail. The present exemplary embodiment has a configuration similar to the first exemplary embodiment.

Generally, the database engine is equipped with a mechanism for enabling designation of bind variables. This enables, when similar queries are repeatedly implemented, implementation of the similar queries, by replacing bind variables while keeping the execution plan fixed, without performing reinterpretation of the SQL statement. This makes it possible to omit computation for recreating the execution plan, and to repeatedly implement retrieval processing by replacing only the retrieval condition values. Thereby the response speed can be upgraded. However, in a case where an execution plan with a low reusability of the cache is created, omitting recreation of the execution plan and repeatedly performing retrieval processing does not necessarily lead to improvement of the response speed.

Thus, according to the present exemplary embodiment, in addition to the first exemplary embodiment, histories assigned to bind variables are recorded and analyzed, in a case where bind variables are specified in the SQL statement and the execution plan is recreated to upgrade the response speed of the retrieval processing.

FIG. 10 illustrates the way how the present exemplary embodiment is exerting the most beneficial effects. Similarly to the first exemplary embodiment, retrieval is performed by combining person names and dates, wherein bind variables 1 are specified to attribute values of person names, and bind variables 2 to attribute values of dates. In the example illustrated in FIG. 10, for the $1^{st}$ time, the attributes of the person names are determined to have higher refinement effect, and thus person name index is selected. Subsequently, at a time point where it is detected that "2010/5/20" is repeatedly substituted as the attribute value of the date in the process of repeating the retrieval processing, the database engine switches to the date index, recreates the execution plan, and implements the retrieval processing. This can enhance the usage efficiency of the database cache, and the response speed.

The details of the processing will be described with reference to the flowchart illustrated in FIG. 11.

First, in step S11001, the database engine 4005 analyzes the SQL statement issued by the retrieval application 4009. Subsequently in step S 11002, the database engine 4005 creates the retrieval execution plan which determines how to implement the retrieval processing corresponding to the retrieval condition, on the basis of the analysis result. In step S11003, retrieval values are substituted into bind variables. At the same time, in step S11004, the database engine 4005 records on the retrieval condition history storage unit 4012, retrieval condition values substituted into the bind variables. In step S11005, the database engine 4005 performs acquisition/analysis of the recorded bind value history, and computes respective hit ratios as the reusability of the database cache with regard to each attribute which is retrieval targets. Then in step S11006, the database engine 4005 determines a reusability of the database cache of the created retrieval execution plan using the above-described hit ratio. If an index with a higher usage efficiency exists (TRUE in step S11006), the database engine 4005 shifts to step S11007 and recreates a retrieval execution plan. Then, in step S11008, the database engine 4005 resubstitutes the substituted bind variables into the new retrieval execution plan. When the retrieval execution plan is defined, in step S11009, the database engine 4005 implements the retrieval processing, and in step S11010, returns a result to the retrieval application. When in step S11011, the retrieval is continued in accordance with an instruction of the retrieval application (TRUE in step S11011), the database engine 4005 shifts to step S11012 and performs necessary initialization processing, and returns to step S11003. By performing the above-described processing, the response speed in steps S11009 and S11010 can be upgraded. Processing contents in step S11002 and S11007 are identical.

As a criterion for determining the reusability of the database cache, similarly to the first exemplary embodiment, appearance frequency of identical value of the retrieval condition, or degree of relative position change within the index of the data which matches the retrieval condition can be used. As its effect, continuous accesses to the database file can be prompted. Further, in a case where static condition designation and condition designation using bind variable are mixed in the SQL statement, an index corresponding to static condition can be preferentially selected. This is because it is apparent that the static condition is not changed during repetitive execution, and a reusability of the index corresponding to the static condition is high, so that as its effect a high hit ratio of the cache is achieved.

The present exemplary embodiment is applicable to the example illustrated in FIG. 2, and retrieval processing can be implemented at a smaller cost, by comparing between bind variables which are portions of the attribute values, without performing analysis of the SQL statement like step S7001 in the first exemplary embodiment.

Other Embodiments

Further, the present invention is also realized by supplying software (program) for implementing the functions of the above-described exemplary embodiment to a system or an apparatus, via a network or various types of storage media, and causing a computer (or a CPU or a micro-processing unit (MPU) and/or the like) of the system or the apparatus to read and execute the program.

According to the present invention, responsiveness of the retrieval processing can be improved and convenience of the user is enhanced by analyzing the retrieval condition and implementing retrieval processing with a high hit ratio of the cache.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-277317 filed Dec. 13, 2010, which is hereby incorporated by reference herein in its entirety.

What is claimed is:

1. A data retrieval apparatus comprising:
   a retrieval condition input unit configured to accept a retrieval condition including an attribute and an attribute value;
   a holding control unit configured to cause a holding unit to retain an index of the attribute acquired from a database corresponding to the retrieval condition; and
   an analysis unit configured to analyze a hit ratio as reusability of the index of the attribute of the holding unit from a number of usage times of the attribute value accepted for the retrieval condition,
   wherein the holding control unit causes the holding unit to preferentially retain the index of the attribute which is analyzed and found to have the reusability by the analysis unit.

2. The data retrieval apparatus according to claim 1 wherein the analysis unit acquires storage positions of the attribute values within an index and analyzes a degree of the storage position change.

3. The data retrieval apparatus according to claim 2 wherein if a retrieval condition input from the retrieval condition input unit is mixed with a retrieval condition using a dynamic bind variable and a retrieval condition using a static variable, the holding control unit causes the holding unit to retain an index of attribute corresponding to the retrieval condition of the static variable.

4. The data retrieval apparatus according to claim 1 wherein the analysis unit obtains appearance frequencies of the attribute values, and analyzes the appearance frequencies while referring to a threshold value.

5. The data retrieval apparatus according to claim 4 wherein the analysis unit obtains a maximum value of the appearance frequencies.

6. The data retrieval apparatus according to claim 4 wherein the analysis unit obtains an average value of appearance frequencies of the attribute values in the attributes.

7. The data retrieval apparatus according to claim 1 wherein a retrieval condition input from the retrieval condition input unit is bind variables.

8. A data retrieval method comprising:
   inputting retrieval condition to accept a retrieval condition including an attribute and an attribute value;
   retaining an index of the attribute acquired from a database corresponding to the retrieval condition;
   analyzing a hit ratio as reusability of the retained the index of the attribute from a number of usage times of the attribute value accepted for the retrieval condition,
   wherein the index of the attribute which is analyzed and found to have the reusability is preferentially retained.

9. A non-transitory computer-readable storage medium storing a program for causing a computer to implement a data retrieval method, the method comprising:
   inputting retrieval condition to accept a retrieval condition including an attribute and an attribute value;
   retaining an index of the attribute acquired from a database corresponding to the retrieval condition;
   analyzing a hit ratio as reusability of the retained the index of the attribute from a number of usage times of the attribute value accepted for the retrieval condition, wherein the index of the attribute which is analyzed and found to have the reusability is preferentially retained.

* * * * *